S. Moyer,
Bending Wood.
Nº 27,560.      Patented Mar. 20, 1860.
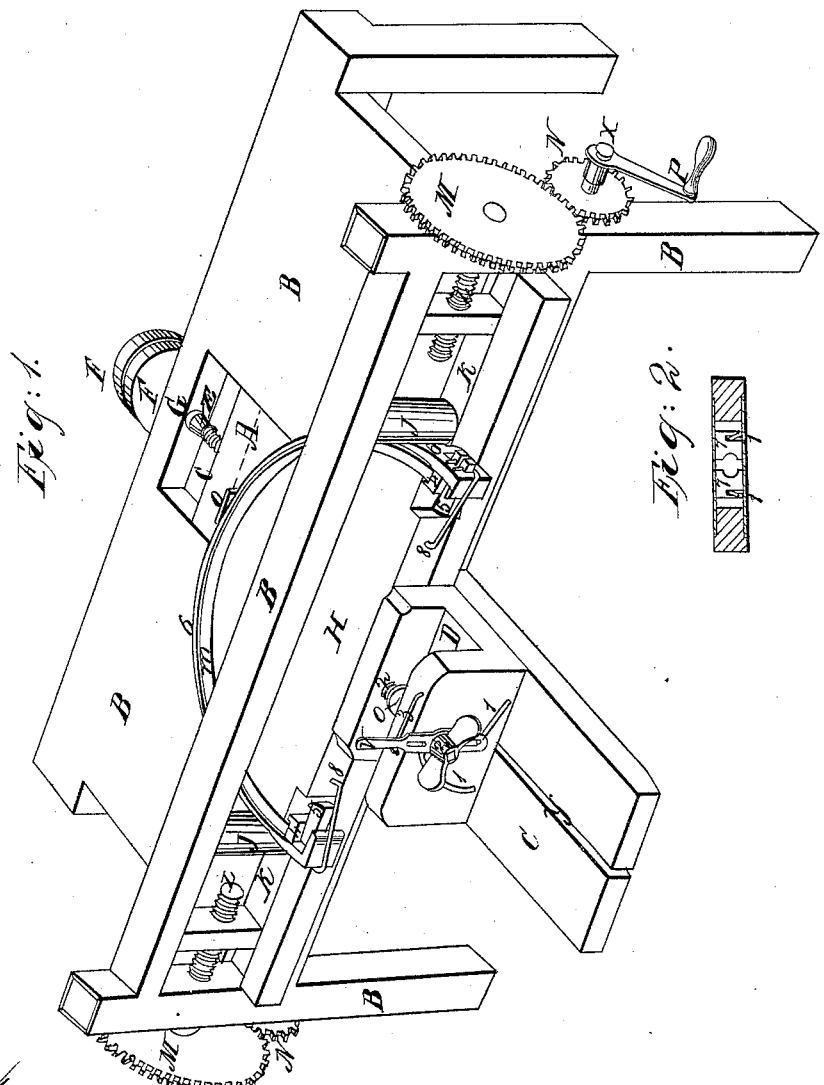
Witnesses:
G. S. Kinsey
Harrison Miller
Inventor:
Salomon Moyer

UNITED STATES PATENT OFFICE.

SALOMON MOYER, OF SHIMERSVILLE, PENNSYLVANIA.

MACHINE FOR BENDING FELLIES.

Specification of Letters Patent No. 27,560, dated March 20, 1860.

*To all whom it may concern:*

Be it known that I, SALOMON MOYER, of Shimersville, Lehigh county, and State of Pennsylvania, have invented new and useful Improvements in Machines for Bending Fellies; and I do hereby declare that the following is a full and exact description thereof, reference being had to the accompanying drawings, and to the characters of reference marked thereon, in which—

Figure 1, is a perspective view and Fig. 2 is a transverse section of the sliding mold rest through the line A.

B represents the framework and table which is furnished with a corresponding track and guide C in the center in a transverse position, upon which the slide mold rest D slides and is kept in its proper place by means of a screw passing up through the slit, Y, into the rest D.

E is a screw for operating the rest during the bending process and revolves in bearings at G and a bearing under the rest not shown in the drawings and is furnished on the outer end with a tight and loose pulleys F, F, to which power is applied by means of a belt or other substantial device.

7, 7, Fig. 2, are half nuts through which the screw E passes and are clamped into the screw when the rest D is to be drawn forward, by means of the lever, V, cranks 1, 1, and clamp 3.

O is a tightening clamp which slides within the slide rest D for clamping the felly, *m*, spring clamp 6 and mold H securely tight to the rest D and is operated by means of the thumb screw 2. The spring clamp 6, is furnished on the inside with a zinc lining to present the fellies from turning black, and is bent inward at the ends forming clamps and is furnished with mortises in which the clamp hooks 4, 4 and wedges 5, 5 slide and are kept in proper place by means of small pins through the outer ends.

8, 8, are movable clamp hooks which hold the spring clamp 6, felly *m*, and mold H securely together while being removed from the machine.

J, J are vertical rollers which have bearings in the sliding frames K, K, which slide in mortises in the table and frame B. The frames K, K, are operated by means of the right and left screws L, L, which have bearings in the framework B and are furnished on their outer ends with gear wheels M, M, which mesh into the pinions N, N, on the crank shaft X, which also has bearings and journal boxes secured to frame B.

P is a hand crank by which means the rollers are operated to and from each other.

The stick of wood to be bent for a felly is laid into the spring clamp 6 and the wedges 5, 5, are driven up tight, whereon it is placed on the slide rest D between the mold H and clamp O, which is drawn up tight by the thumb screw 2. The nuts 7, 7, are clamped onto the revolving screw E by means of the lever V, and cranks 1, 1, when the rest D is drawn forward by the revolving screw E to the desired distance whereon the belt is shifted on the loose pulley and the slide rest brought to a stand and by turning the crank P the rollers J, J, press the spring clamp 6 and felly, *m*, tight up to the mold H. The movable clamp hooks 8, 8, are then put on. The crank P is now turned in opposite direction which withdraws the rollers J, J, and the lever, V, is released from clamp 3 by which means the half nuts 7, 7, are released from the screw E, whereon the slide rest D is drawn back by the operator and the tightening clamp O, is released by means of the thumb screw 2 whereon the mold with the felly and the spring clamp is removed from the machine.

What I claim as my invention and desire to secure by Letters Patent is—

The sliding mold rest D, when operated as described in combination with the tightening clamp O, thumb screw 2, and lever V, in connection with the cranks 1, 1, for operating the half nuts 7, 7, when constructed as and used for the purpose set forth.

SALOMON MOYER.

Witnesses:
G. S. KINSEY,
SALOMON GOW,
HARRISON MILLER.